(12) United States Patent
Biteau (10) Patent No.: US 12,405,403 B2
(45) Date of Patent: Sep. 2, 2025

(54) LENS WITH SURFACE MICROSTRUCTURES ENCAPSULATED BY A SELF-STRATIFIED HARD COAT

(71) Applicant: Essilor International, Charenton-le-pont (FR)

(72) Inventor: John Biteau, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 504 days.

(21) Appl. No.: 17/920,471

(22) PCT Filed: Apr. 22, 2021

(86) PCT No.: PCT/EP2021/060478
§ 371 (c)(1),
(2) Date: Oct. 21, 2022

(87) PCT Pub. No.: WO2021/214197
PCT Pub. Date: Oct. 28, 2021

(65) Prior Publication Data
US 2023/0152496 A1    May 18, 2023

(30) Foreign Application Priority Data
Apr. 23, 2020 (EP) .................................. 20305401

(51) Int. Cl.
*G02B 1/14* (2015.01)
*G02B 1/113* (2015.01)
(Continued)

(52) U.S. Cl.
CPC ................ *G02B 1/14* (2015.01); *G02B 1/113* (2013.01); *G02B 1/118* (2013.01); *G02B 3/08* (2013.01); *G02B 1/16* (2015.01)

(58) Field of Classification Search
CPC .......... G02B 1/14; G02B 1/113; G02B 1/118; G02B 3/08; G02B 1/16; B29D 11/00009;
(Continued)

(56) References Cited

U.S. PATENT DOCUMENTS

| 6,104,536 A * | 8/2000 | Eckhardt .............. G02B 27/285 |
| | | 359/619 |
| 2012/0201965 A1* | 8/2012 | Soucek ................. C08F 220/14 |
| | | 524/508 |

(Continued)

FOREIGN PATENT DOCUMENTS

| EP | 3640714 | 4/2020 |
| JP | 2000152224 | 5/2000 |

(Continued)

OTHER PUBLICATIONS

Beaugendre et al., "Self-stratifying epoxy/silicone coatings" Progress in Organic Coatings 2017, 103, pp. 101-110.
(Continued)

*Primary Examiner* — Balram T Parbadia
(74) *Attorney, Agent, or Firm* — Norton Rose Fulbright US LLP (57) ABSTRACT

Optical articles comprising a base-lens substrate having at least one optical element or a plurality of optical elements protruding from a surface thereof, and the method for forming such optical articles. The optical articles comprise the base-lens substrate, a protective layer protecting said substrate, and at least one optical element or a plurality of optical elements, wherein the protective layer does not reduce or suppress the optical effect of the optical element and ensures abrasion resistance.

15 Claims, 5 Drawing Sheets

(51) Int. Cl.
*G02B 1/118* (2015.01)
*G02B 3/08* (2006.01)
*G02B 1/16* (2015.01)

(58) Field of Classification Search
CPC .......... B29D 11/00317; B29D 11/0073; G02C 2202/24; G02C 7/06; G02C 7/02; C09D 5/00
See application file for complete search history.

(56) References Cited

U.S. PATENT DOCUMENTS

| | | | | |
|---|---|---|---|---|
| 2015/0309332 | A1* | 10/2015 | Hillenbrand | G02C 7/022 351/159.58 |
| 2016/0306192 | A1* | 10/2016 | Marshall | G02C 7/06 |
| 2017/0131567 | A1 | 5/2017 | To et al. | |
| 2017/0184875 | A1* | 6/2017 | Newman | B29D 11/00326 |

FOREIGN PATENT DOCUMENTS

| | | |
|---|---|---|
| JP | 2009175226 | 8/2009 |
| JP | 2010204456 | 9/2010 |
| JP | 2011065028 | 3/2011 |
| JP | 2012178632 | 9/2012 |
| WO | WO 2016/168746 | 10/2016 |
| WO | WO 2018/124204 | 7/2018 |
| WO | WO 2019/124352 | 6/2019 |

OTHER PUBLICATIONS

International Search Report and Written Opinion issued in Corresponding PCT Application No. PCT/EP2021/060478, dated Jul. 28, 2021.

Zahedi et al., "Self-stratifying coatings: a review" Journal of Coatings Technology and Research 2018, 15(1), pp. 1-12.

* cited by examiner

Liquid coating    substrate to be coated

Theoretical coating amount depends of wire rod size (Grams Dry per Square Meter)

| Rod Size | Wet Mils | Thickness Microns | 30% Solids | 40% Solids | 75% Solids | 100% Solids |
|---|---|---|---|---|---|---|
| #3 | .3 | 7.6 | 2.18 | 2.91 | 5.47 | 7.29 |
| #4 | .4 | 10.2 | 2.91 | 3.88 | 6.83 | 9.11 |
| #5 | .5 | 12.7 | 3.64 | 4.85 | 9.11 | 12.14 |
| #6 | .6 | 15.2 | 4.38 | 5.82 | 10.93 | 14.58 |
| #7 | .7 | 17.8 | 5.09 | 6.80 | 12.74 | 16.99 |
| #8 | .8 | 20.3 | 5.82 | 7.78 | 14.58 | 19.43 |
| #9 | .9 | 22.9 | 6.56 | 8.34 | 16.40 | 21.87 |
| #10 | 1.0 | 25.4 | 7.28 | 9.71 | 18.21 | 24.28 |
| #11 | 1.1 | 27.9 | 8.00 | 10.69 | 20.04 | 26.72 |
| #12 | 1.2 | 30.5 | 8.74 | 11.65 | 21.87 | 29.16 |
| #13 | 1.3 | 33.0 | 9.47 | 12.63 | 23.71 | 31.60 |
| #14 | 1.4 | 35.6 | 10.20 | 13.60 | 25.51 | 34.00 |
| #15 | 1.5 | 38.1 | 10.93 | 14.58 | 27.32 | 36.41 |
| #16 | 1.6 | 40.6 | 11.65 | 15.54 | 29.14 | 38.85 |
| #17 | 1.7 | 43.2 | 12.38 | 16.51 | 30.99 | 41.29 |
| #18 | 1.8 | 45.7 | 13.11 | 17.49 | 32.78 | 43.70 |
| #19 | 1.9 | 48.3 | 13.85 | 18.45 | 34.61 | 46.14 |
| #20 | 2.0 | 50.8 | 14.58 | 19.43 | 36.41 | 48.55 |
| #22 | 2.2 | 55.9 | 16.03 | 21.36 | 40.07 | 53.43 |
| #24 | 2.4 | 61.0 | 17.49 | 23.31 | 43.72 | 58.28 |
| #26 | 2.6 | 66.0 | 18.94 | 25.25 | 47.38 | 63.16 |
| #28 | 2.8 | 71.1 | 20.40 | 27.20 | 51.04 | 68.04 |
| #30 | 3.0 | 76.2 | 21.85 | 29.14 | 54.65 | 72.86 |
| #32 | 3.2 | 81.3 | 23.31 | 31.09 | 58.28 | 77.72 |
| #34 | 3.4 | 86.4 | 24.76 | 33.04 | 61.62 | 82.55 |
| #36 | 3.6 | 91.4 | 26.23 | 34.96 | 65.55 | 87.40 |

LENS WITH SURFACE MICROSTRUCTURES ENCAPSULATED BY A SELF-STRATIFIED HARD COAT

CROSS-REFERENCE TO RELATED APPLICATIONS

This application is a national phase application under 35 U.S.C. § 371 of International Application No. PCT/EP2021/060478 filed 22 Apr. 2021, which claims priority to European Patent Application No. 20305401.0 filed 23 Apr. 2020. The entire contents of each of the above-referenced disclosures is specifically incorporated by reference herein without disclaimer.

FIELD OF THE INVENTION

The invention relates to an optical article comprising a base lens substrate having at least one optical element or a plurality of optical elements such as microlenses, a Fresnel structures, etc protruding from a surface thereof, and the method for forming such optical articles.

BACKGROUND OF THE INVENTION

Optical articles such as lenses generally comprise a base-lens substrate which is shaped in order to provide a desired optical power, and an anti-abrasion coating covering at least one surface of the base-lens substrate to prevent the latter from being damaged by scratches.

An anti-abrasion coating, also known as hard coating, provides, according to a favorite embodiment with a bi-layered structure, a hardness gradient from the base-lens substrate to the free surface of the anti-abrasion coating. The upper layer of the coating defines the hardest part of the coating at the free surface thereof and allows a protection against thin particles and thin scratches, while the lower layer of the coating defines the less hard part underneath can absorb shocks provided by bigger particles and prevent formation of larger scratches. It also provides a transition with the hardness of the base-lens substrate to prevent formation of cracks at the interface between the substrate and the abrasion-resistant coating.

For a number of applications, it has been found desirable to provide on the base-lens substrate a plurality of optical elements, such as microlenses, providing a local change of the power of the optical article. For instance, it is known from US 2017/0131567 a lens comprising a plurality of microlenses formed on a surface of the lens, the local change of power provided by the microlenses enabling to suppress or slow down the progress of myopia.

It is also known from document WO2016/168746 a lens having a first optical power, the lens comprising an array of microlenses having a second optical power, the microlenses allowing to increase the correction provided by the lens even though the curvature of the lens is limited, or allowing forming multifocal lenses with large areas of different optical powers while not exhibiting sharp steps that are visible at a micro-scale.

Figure 1A:
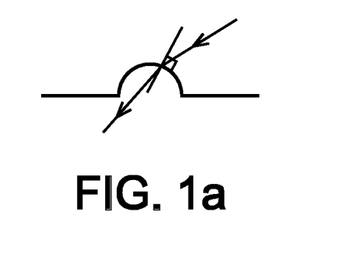
FIGS. 1a and 1b, which have already been described, depicts the impact of a protective layer covering a substrate comprising optical elements (microlenses) on the path of an incoming ray of light.
Figure 1B:
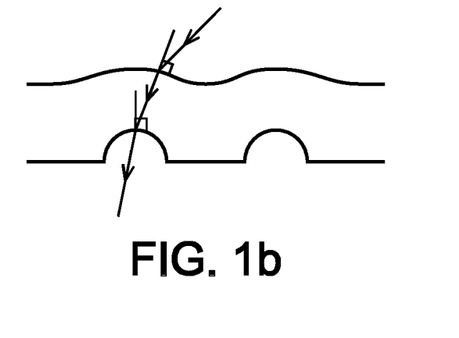

With reference to FIGS. 1a and 1b, the covering of a lens having microlenses with an abrasion-resistant coating changes the power of the microlenses and therefore reduces or impairs the effect provided by the microlenses. Indeed, the thickness of a microlens is usually of about 1 µm to 2 µm while the typical thickness of an abrasion-resistant coating is of about 3 µm. Thus, when a surface comprising protruding elements such as microlenses is covered by abrasion-resistant coating (typically applied by dipping), the free surface of the abrasion-resistant coating is not exactly of the same curvature than that of the lens it covers. Instead, the presence of the protruding elements causes said free surface to exhibit local deformations of the surface.

As shown on FIG. 1b, a ray of light incident on one such deformation undergoes a first refraction when entering into the abrasion-resistant coating, and a second refraction at the interface with the microlens of the base-lens substrate, and therefore the path of the ray of light is changed as compared to its path if there was no abrasion-resistant coating (FIG. 1a).

A solution has been proposed consisting of reducing the thickness of the abrasion-resistant coating to reduce this alteration of the microlenses power. However, it has been measured that there still remains an alteration of the power since the local power P' of the microlenses covered with this coating is about P−0.5 (P being the initial power of the microlenses without coating). Furthermore, the properties of protection against scratching of the coating are highly reduced, so this solution is not satisfactory.

The same kind or problem arises for other optical structures present on a base-lens substrate. For instance, structures such as Fresnel rings also undergo a perturbation of power when covered by an abrasion-resistant coating.

There is therefore still a need for optical lenses with microstructures such as microlenses with good optical properties but also good mechanical properties.

SUMMARY OF THE INVENTION

The purpose of the invention is to provide a solution to the defects in the prior art.

In particular, one aim of the invention is to provide an optical article comprising a base-lens substrate, a protective layer protecting said substrate, and at least one optical element (such as microlens) or a plurality of optical elements, wherein the protective layer does not reduce or suppress the optical effect of the optical element and ensures a good abrasion resistance, contrary to the prior art when the abrasion resistant coating somewhat reproduces the surface microstructure.

The above-mentioned purpose is achieved by a combination of the characteristics described in the independent claims, and the subordinate claims provide specific advantageous examples of the invention.

An optical article and a method of manufacturing the same are disclosed.

Thus, in one embodiment, an optical article is disclosed, the article comprising:
  a base lens substrate having opposing first and second lens surfaces;
  a protective layer having opposing first and second protective surfaces; and
  at least one or a plurality of optical elements, each:
defining a portion of one of the first protective surface and the second lens surface; having a maximum height, measured in a direction perpendicular to the second lens surface carrying them, that is less than or equal to 0.1 millimeters (mm) and a diameter that is less than or equal to 2.0 mm.
wherein
the protective layer is composed of:
a self-stratified coating having at least two distinct layers:
  a first layer $L_{SSC1}$ corresponding to the innermost part of the protective layer and having two opposing surfaces, one surface corresponding to first protective surface and a second layer $L_{SSC2}$ corresponding to the outermost part of the protective layer and having two opposing surfaces, one surface corresponding to second protective surface the self-stratified coating resulting from the polymerization of a self-stratifying composition comprising at least two, preferably two incompatible resins compositions, resin composition 1 and resin composition 2 the first layer $L_{SSC1}$ being constituted of one of the at least two resins resin compositions, resin composition 1 after curing, cured resin 1, said cured resin 1:

showing a refractive index $n_{SSC1}$ being lower than the refractive index $n_m$ of the at least one or each optical element such that the difference $n_m - n_{SSC1}$ is greater than 0.045, preferably greater than 0.10, or even greater than 0.15;

the second layer $L_{SSC2}$ being constituted of the other one of the at least two resin compositions, resin composition 2 after curing, said cured resin 2:

showing a refractive index $n_{SSC2}$ being similar or higher than the refractive index $n_{SSC1}$.

Another object of the present invention is a method of manufacturing an optical article or of manufacturing the optical article according to the invention, the method comprising:

1) providing a base lens substrate having opposing first and second lens surfaces and comprising, on the second lens surface, at least one or a plurality of optical elements having a maximum height, measured in a direction perpendicular to the second lens surface, that is less than or equal to 0.1 millimeters (mm) and a diameter that is less than or equal to 2.0 mm;

2) applying by wet deposition on the second lens surface of the base lens substrate comprising the at least one or the plurality of optical elements, a curable self-stratifying composition suitable for forming a protective layer having opposing first and second protective surfaces;

3) curing the curable self-stratifying composition for forming the protective layer;

4) optionally repeating step 2 or step 2 and step 3;

the protective layer resulting from step 3 or 4 presenting a second protective surface parallel to the second lens surface of the lens devoid of optical elements, said protective layer encapsulating the at least one or each optical element.

The protective layer of the present invention is composed of a self-stratified coating. In other words, the protective layer is obtained by curing a self-stratifying composition enabling to get in only one deposition step at least two distinct layers $L_{SSC1}$ and $L_{SSC2}$.

The protective layer has the role of presenting a contrast in refractive index with the optical elements in order to ensure the optical function of the optical elements thanks to the layer $L_{SSC1}$. Its role is also to protect the base lens substrate from scratches and abrasion thanks to the layer $L_{SSC2}$. The protective layer is as thick as it enables to encapsulate each optical element (such as a microlens).

Furthermore, the free surface of the protective layer (i.e the second protective layer of the protective layer corresponding also to the outermost surface of $L_{SSC2}$ or the surface of $L_{SSC2}$ in contact with air) is exactly the same as that of the surface of the base lens substrate it covers (i.e second lens surface of the lens devoid of optical elements), and has the same base curve. In other words, the second protective surface is parallel to the second lens surface of the lens devoid of optical elements or the protective layer exhibits the same base curve as the base curve of the second lens surface of the base lens substrate devoid the optical elements. The protective layer comprises a smooth free surface (i.e a smooth second protective layer). The second protective layer of the protective layer does not replicate the height change present at the first protective surface. As a consequence, the shape of each optical element and its optical power are not impaired by the coating, and therefore the detrimental effects disclosed before related to the deposition of the coating do not happen. Furthermore the protective layer shows a good abrasion resistance thanks to its bilayer structure as mentioned above but also thanks to the smooth surface. When the coating reproduces the surface microstructures, an accidental indent sliding on the surface of the lens encounters multiple abrupt changes of angles between the tip of the indent and the surface of the coating, leading to a higher scratch probability of scratching the hard coated surface.

The smooth free surface of the protective layer is also particularly advantageous for subsequent deposition of other functional coatings such as antireflective, anti-soiling, or anti-fogging coatings, aesthetic and comfort.

The materials forming respectively the layer $L_{SSC1}$ of the protective layer and the optical element are selected to provide a gap of index of refraction of greater than 0.045, preferably at least 0.1, the protective layer material having an index of refraction lower than the index of refraction of the material forming the optical element. This index gap allows to obtain the desired optical power for the optical element while having a physical height which is relevant for the various technologies used by the man of the art to produce optical elements on a lens surface, while not needing high physical thickness of optical elements and not inducing macroscopic visibility of the optical elements or unpleasant aesthetics, or making them difficult to be covered by common coating techniques.

Unless otherwise specified, the refractive indexes in the present invention are expressed at 25° C. at a wavelength of 589 nm.

DESCRIPTION OF THE DRAWINGS

For a more complete understanding of the description provided herein and the advantages thereof, reference is now made to the brief descriptions below, taken in connection with the accompanying drawings and detailed description, wherein like reference represent like parts.

DETAILED DESCRIPTION

Optical Article Comprising Optical Elements

The optical article according to the invention will now be described.

The optical article comprises
- a base lens substrate having opposing first and second lens surfaces,
- a protective layer having opposing first and second protective surfaces, the first protective surface disposed on the second lens surface and
- at least one or a plurality of optical elements, each defining a portion of one of the first protective surface and the second lens surface.

The Base Lens Substrate

The base lens substrate 10 may comprise a single layer or may be formed of a laminate. The base lens substrate 10 preferably comprises at least a plano wafer 11, or a base lens 12 providing optical power, or both, i.e. a base lens 12 providing optical power and a wafer 11 complementing the base lens 12 with an optical function as described below. In the example shown in FIG. 2a, the base-lens substrate 10 comprises a plano wafer 11 and a base lens 12. In the example shown in FIG. 2b, the base lens substrate 10 only comprises a base lens 12.

A plano wafer 11 has no optical power and hence provides no correction to the wearer, but acts as a mechanical support for other layers, and optionally also provides one or more functional properties to the finished optical article, such as at least one among the following optical functions:
- Amplitude filtering function,
- Spectral filtering function (such as edgepass like shortpass or longpass, or bandpass filtering, or filtering of specific colors, for instance by tinting, or incorporating photochromic or electrochromic functions, UV absorption, mirror, etc.),
- Polarization function.

A plano wafer 11 refers to a film structure formed by either a single film layer or a film laminate structure formed of multiple film layers attached to one another. More precisely, the plano wafer 11 may be formed by one or several ophthalmic-grade function film (with for example polar or photochromic properties), optionally having an ophthalmic-grade protective film on one or both sides of the ophthalmic grade functional film.

A plano wafer 11 may exhibit a thickness in the range of 20 to 700 micrometers, preferably 30 to 600 μm. The protective layer(s), if any, may have a thickness of about 50 μm.

Suitable transparent resin film or sheet materials for forming the plano wafer (including functional and protective films) include poly(vinyl alcohol) (PVA) or cellulose acylate-based materials, for example, cellulose diacetate and cellulose triacetate (TAC). Other usable wafer materials can include polycarbonate, polysulfone, cellulose acetate butyrate (CAB) or cyclic oleofin copolymer (COC), polyacrylate, polyester, polystyrene, copolymers of acrylate and styrene, and poly(vinylalcohol) (PVA). Polycarbonate-based materials include, for example, polybisphenol-A carbonate; homopolycarbonate such as 1,1' dihroxydiphenyl-phenylmethane, 1,1'-dihroxydiphenyl-diphenylmethane, 1,1'-dihydroxy-3,3'-dimethyl diphenyl-2,2-propane, their mutual copolymer polycarbonate and copolymer polycarbonate with bisphenol-A.

The base lens 12 may be formed in optic plastic, for example made of thermoplastic or thermosetting plastic. In particular, thermoplastic materials may be selected from, for instance: polyamides, polyimide, polysulfones, polycarbonates and copolymers thereof, poly(ethylene terephtalate) and polymethylmethacrylate (PMMA).

Thermosetting materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof. As used herein, a (co)polymer is intended to mean a copolymer or a polymer. As used herein, a (meth)acrylate is intended to mean an acrylate or a methacrylate.

Examples of substrates to be suitably used in the present invention include those obtained from MR6®, MR7®, MR8®, MR1.74® and MR10® resins (thermosetting polythiourethane resins). The various substrates based on polythiourethane resins are marketed by the Mitsui Toatsu Chemicals Company and these substrates as well as the monomers used for their preparation are especially described in the patents U.S. Pat. Nos. 4,689,387, 4,775,733, 5,059,673, 5,087,758 and 5,191,055.

The base lens substrate 10 or the base lens 12 can advantageously be made in an optical plastic, preferably a thermoplastic or thermosetting plastic selected from, for instance: polycarbonate, of polyamide, of polyimide, of polysulfone, of copolymers of poly(ethylene terephthalate) and polycarbonate, of polyolefins, in particular of polynorbornene, of homopolymers and copolymers of diethylene glycol bis(allyl carbonate), of (meth)acrylic polymers and copolymers, in particular (meth)acrylic polymers and copolymers derived from bisphenol A, of thio(meth)acrylic polymers and copolymers, of polyurethane and polythiourethane homopolymers or copolymers, epoxy polymers and copolymers and episulfide polymers and copolymers, preferably made of polycarbonate, diethylene glycol bis(allylcarbonate) polymer, or of a thermosetting polythiourethane resin having a refractive index of 1.60 or a thermosetting polythiourethane resin having a refractive index of 1.67, more preferably made of polycarbonate.

For example, it will be possible to use polycarbonate, such as Lexan OQ3820®, in particular with a refractive index of 1.586, sold by Sabic, a diethylene glycol bis(allyl carbonate), such as CR39®, in particular with a refractive index of 1.5, sold by PPG Industries, or else a polythiourethane, such as MR7®, in particular with a refractive index of 1.66, sold by Mitsui Toatsu.

The base lens 12 is preferably shaped to provide optical power suitable for correcting a wearer ametropia, for instance myopia or hyperopia. The base lens 12 may be a finished lens, a monofocal or multifocal lens such as a multifocal progressive lens.

The base substrate 10 may comprise other layers in addition to the base lens 12 and/or plano wafer 11, such as for instance photochromic Trans-Bonding® layer on a front surface of a base lens 12, or any additional layer which can be deposited on the base lens or plano wafer and which incorporates an optical function such that:

Amplitude filtering function,

Spectral filtering function (such as edgepass like shortpass or longpass, or bandpass filtering, or filtering of specific colors, for instance by tinting, or incorporating photochromic or electrochromic functions, UV absorption, mirror, etc.), Polarization function.

The base lens 12 may also be a semi-finished lens which means that it does not provide the final power, also called target power, of the lens that is to be manufactured from the semi-finished lens. It may provide a power which is not the target power, said target power being obtained by later surfacing of the semi-finished lens.

The base lens 12 may also be a lens which is not trimmed, which means that its peripheral shape has not been adjusted to the shape of a frame in which it will then be inserted.

Figure 2A:
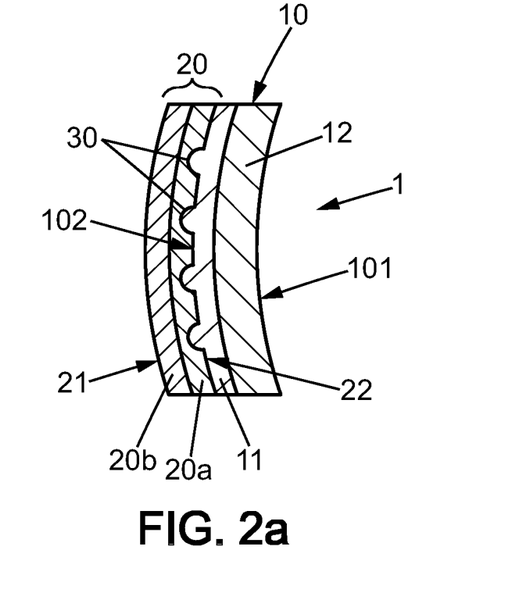
FIGS. 2a to 2d schematically show examples of the optical article of the present invention.

As shown in FIGS. 2a to 2d, the base lens substrate 10 comprises two opposing first and second lens surfaces, two opposite main surfaces comprising a back surface 101 and a front surface 102. In the example of FIG. 2a, the front surface 102 of the base lens substrate 10 is formed by a front surface of a plano wafer 11, whereas in the example of FIG. 2b, the front-surface 102 of the base lens surface 10 is formed by a front surface of a lens 12.

The Optical Elements or Plurality of Optical Elements

The optical article 1 further comprises at least one optical element 30 or a plurality of optical elements having opposing first and second protective surfaces, and defining the first protective surface disposed on the second lens surface, for example protruding from one of the main surfaces of the base lens substrate 10. In preferred embodiments, each optical element 30 protrudes from the front surface 102 of the base-lens substrate 10.

By "protruding" is meant that each optical element projects from the surface of the base lens substrate 10, outwardly, i.e. away from said substrate. Each optical element is therefore convex.

In one embodiment, each optical element 30 is formed of the same material as the base lens substrate 10 and may be formed integral with the latter. If the base lens substrate 10 is a laminate, each optical element 30 may be formed of the same material that the layer from which is protrudes.

In one embodiment each optical element 30 is formed of the same material as the base lens substrate 10 and said material is for example chosen among the thermoplastic or thermosetting optical plastic such as polycarbonate, of polyamide, of polyimide, of polysulfone, of copolymers of poly(ethylene terephthalate) and polycarbonate, of polyolefins, in particular of polynorbornene, of homopolymers and copolymers of diethylene glycol bis(allyl carbonate), of (meth)acrylic polymers and copolymers, in particular (meth)acrylic polymers and copolymers derived from bisphenol A, of thio(meth)acrylic polymers and copolymers, of polyurethane and polythiourethane homopolymers or copolymers, epoxy polymers and copolymers and episulfide polymers and copolymers, preferably made of polycarbonate, diethylene glycol bis(allylcarbonate) polymer, or of a thermosetting polythiourethane resin having a refractive index of 1.60 or a thermosetting polythiourethane resin having a refractive index of 1.67, more preferably made of polycarbonate.

In what follows, an optical element is a discrete optical element of microscopic scale, inducing a local change in optical power of the optical device.

In one embodiment, the optical elements are configured so that at least along one section of the lens the mean sphere of the optical elements increases from a point of said section towards the peripheral of said section.

According to an embodiment the optical elements are configured so that at least along one section of the lens, for example at least the same section as the one along which the mean sphere of the optical elements increases, the mean cylinder increases from a point of said section, for example the same point as for the mean sphere, towards the peripheral part of said section.

According to an embodiment the optical elements or plurality of optical elements are microlenses. A microlens may be spherical, toric, or have an aspherical shape. A microlens may have a single focus point, or cylindrical power, or non-focusing point. In preferred embodiments, microlenses can be used to prevent progression of myopia or hyperopia. In that case, the base lens substrate comprises a base lens 12 providing an optical power for correcting myopia or hyperopia, and the microlenses may provide respectively an optical power greater than the optical power of the base lens 12 if the wearer has myopia, or an optical power lower than the optical power of the base lens 12 if the wearer has hyperopia.

In the sense of the present disclosure, a "microlens" has a contour shape being inscribable in a circle having a diameter greater than or equal to 0.8 mm and smaller than or equal to 3.0 mm.

For example, the microlenses may be regularly distributed along circles centered on the optical center of the refraction area.

The mean cylinder of the different micro lenses may be adjusted based on the shape of the retina of the person.

The refraction area may comprise a far vision reference point, a near vision reference, and a meridian line joining the far and near vision reference points. For example, the refraction area may comprise a progressive additional lens design adapted to the prescription of the person or adapted to slow down the progression of the abnormal refraction of the eye of the person wearing the lens element.

The meridian line corresponds to the locus of the intersection of the main gaze direction with the surface of the lens.

Preferably, according to such embodiment, the microlenses are configured so that in standard wearing conditions along any horizontal section of the lens, when worn by a wearer, the mean sphere and/or the mean cylinder of the microlenses increases from the intersection of said horizontal section with the meridian line towards the peripheral part of the lens.

The mean sphere and/or the mean cylinder increase function along the sections may be different depending on the position of said section along the meridian line.

In particular, the mean sphere and/or the mean cylinder increase function along the sections are unsymmetrical. For example, the mean sphere and/or the mean cylinder increase function are unsymmetrical along vertical and/or horizontal section in standard wearing conditions.

At least one of the microlenses, has an optical function of not focusing an image on the retina of the eye of the person when the lens element is worn in standard wearing conditions.

Advantageously, such optical function of the microlens combined with a refractive area having at least one refractive power different from the refractive power of the prescription allows slowing down the progression of the abnormal refraction of the eye of the person wearing the lens element.

The microlenses may be non-contiguous.

In the sense of the present disclosure two microlenses are non-contiguous if for all the paths linking the two microlenses one may measure at least along part of each path the refractive power based on a prescription for the eye of the person.

When the two microlenses are on a spherical surface, the two microlenses are non-contiguous if for all the paths linking the two optical elements one may measure at least along part of each path the curvature of said spherical surface.

According to an embodiment, at least one of the microlenses has an optical function of focusing an image on a position other than the retina.

Preferably, at least 50%, for example at least 80%, for example all, of the microlenses have an optical function of focusing an image on a position other than the retina.

According to an embodiment, at least one of the microlenses has a non-spherical optical function.

Preferably at least 50%, for example at least 80%, for example all, of the microlenses have a non-spherical optical function.

In the sense of the present disclosure, a "non-spherical optical function" is to be understood as not having a single focus point.

The at least one microlens having a non-spherical optical function is transparent.

One can add these microlenses on a defined array like circle, square or hexagonal or random or other.

The microlenses may cover specific zones of the lens element, like at the center or any other area.

The optical element density or the quantity of power may be adjusted depending on zones of the base lens substrate. Typically, the microlenses may be positioned in the periphery of the base lens substrate, in order to increase the effect of the optical element on myopia control, so as to compensate peripheral defocus due to the peripheral shape of the retina for example.

According to an embodiment, at least one, for example all, of the microlenses has a shape configured so as to create a caustic in front of the retina of the eye of the person. In other words, such microlens is configured so that every section plan where the light flux going through said microlens is concentrated if any, is located in front of the retina of the eye of the person, either in a punctual way in a plan or never in a punctual manner in none of those section plan.

According to an embodiment, the at least one, for example all, of the microlenses having a non-spherical optical function is a multifocal refractive micro-lens.

In the sense of the present disclosure, a microlens being a "multifocal refractive microlens" includes bifocals (with two focal powers), trifocals (with three focal powers), progressive addition lenses, with continuously varying focal power, for example aspherical progressive surface lenses.

According to an embodiment, the at least one multifocal refractive micro-lens has a toric surface. A toric surface is a surface of revolution that can be created by rotating a circle or arc about an axis of revolution (eventually positioned at infinity) that does not pass through its center of curvature.

Toric surface lenses have two different radial profiles at right angles to each other, therefore producing two different focal powers.

Toric and spheric surface components of toric lenses produce an astigmatic light beam, as opposed to a single point focus.

According to an embodiment, the at least one of the microlenses having a non-spherical optical function, for example all, of the optical elements is a toric refractive micro-lens. For example, a toric refractive micro-lens with a sphere power value greater than or equal to 0 diopter ($\delta$) and smaller than or equal to +5 diopters ($\delta$), and cylinder power value greater than or equal to 0.25 Diopter ($\delta$).

As a specific embodiment, the toric refractive microlens may be a pure cylinder, meaning that minimum meridian line power is zero, while maximum meridian line power is strictly positive, for instance less than 5 Diopters.

According to an embodiment, at least one, for example all of the microlenses, has an optical function with high order optical aberrations. For example, the microlens is composed of continuous surfaces defined by Zernike polynomials.

The optical elements of the present invention, typically the microlenses, have a maximum height, measured in a direction perpendicular to the second lens surface carrying them, that is less than or equal to 0.1 millimeters (mm), preferably comprised between 2 and 20 micrometers (μm) and a diameter that is less than or equal to 2.0 mm, comprised between 0.8 and 2.0 millimeter (mm).

Figure 2B:
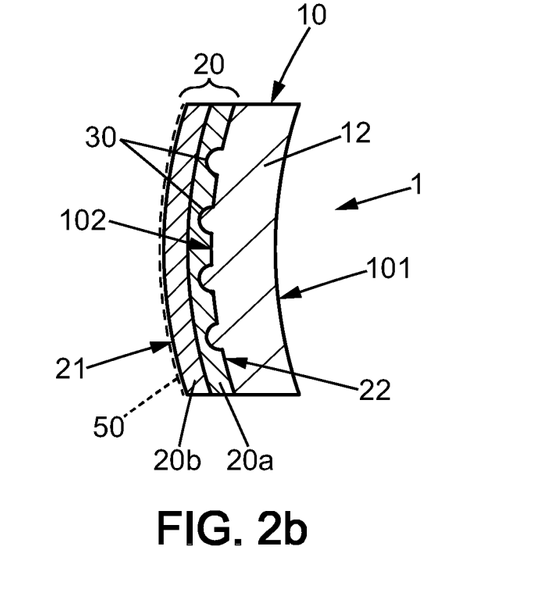

Back to FIGS. 2a and 2b, one can notice that the surface of the base-lens substrate carrying the microlenses 30, typically the front surface 102, is convex and is formed by two kinds of outer surfaces: a first one is the outer surface of each optical element, comprising local curvature variations due to the shape of the microlenses, whereas the second one is the surface of the base lens substrate disposed between the microlenses, which exhibits fewer or even no local curvature variations. Preferably, the difference induced by a local curvature variation of a microlens compared to the surrounding second kind of surface is at least 1 D.

The base lens substrate therefore exhibits a thickness in average greater at the microlens than away from them, and the maximum thickness of the substrate is reached at the point of maximum thickness of the microlenses.

According to another embodiment the at least one optical element or plurality of optical elements are Fresnel structures, diffractive structures such as microlenses defining each a Fresnel structure, permanent technical bumps or phase-shifting elements. It can also be a refractive optical element such as microprisms and a light-diffusing optical element such as small protuberances or cavities, or any type of element generating roughness on the substrate.

The Protective Layer:

The protective layer of the present invention fully encapsulates the at least one or plurality of optical elements. The protective layer shows a second protective surface parallel to the second lens surface of the lens devoid of optical elements.

The protective layer is composed of a self-stratified coating composed of at least two distinct layers:
- a first layer $L_{SSC1}$ corresponding to the innermost part of the protective layer and having one surface corresponding to first protective surface; and
- a second layer $L_{SSC2}$ corresponding to the outermost part of the protective layer and having one surface corresponding to second protective surface.

The protective layer is obtained by curing a self-stratifying composition enabling to obtain in only one deposition step at least two distinct layers $L_{SSC1}$ and $L_{SSC2}$. The self-stratified coating resulting from the polymerization of a self-stratifying composition comprises at least two, preferably two incompatible resins compositions, resin composition 1 and resin composition 2.

The at least two resin compositions have a different surface tension, the difference in the surface tensions of the at least two resin compositions is greater than 4 mN/m, preferably greater than 10 mN/m and the surface tension of the resin composition 1 being greater than the surface tension of the lens substrate. Surface energies are calculated in the present application by the OWENS-WENDT method described in the following reference: "Estimation of a surface force energy of polymers" OWENS D. K., WENDT R. G. (1969) J. Appl. Polym. Sci, 13, 1741-1747, using a semiautomatic goniometer with image acquisition and analysis from KRUSS-DSA100.

The expression "incompatible resin compositions" means giving rise in "one pot" to a two-phases mixture/to at least two distinct phases or two distinct layers after the formation of the solid film. The two incompatible resins compositions are not fully miscible with each other. In other words the self-stratifying coating useful for the present invention comprises two incompatible resin compositions, at least partially incompatible resin compositions, mixed in a solvent blend and which separate spontaneously after application and curing of said self-stratifying coating, upon evaporation of the solvent(s). The segregation takes place producing a layer having more affinity with the base lens substrate and/or the at least one optical element to cover and another layer having more affinity for the surface or the air.

In the present invention the resin composition having more affinity with the base lens substrate and/or the at least one optical element to cover is resin composition 1 or curable resin composition 1. It has as main attribute to be low refractive index. On the other hand, the resin composition having more affinity with the surface or the air is resin composition 2 or curable resin composition 2. Resin composition 2 has as main attribute a good mechanical strength, good abrasion and scratch resistance. Thus, the first layer $L_{SSC1}$ is constituted of the resin composition 1 after curing, cured resin 1, said cured resin 1 showing a refractive index $n_{SSC1}$ being lower than the refractive index n, of the at least one or each optical element such that the difference $n_m-n_{SSC1}$ is greater than 0.045, preferably greater than 0.10, or even greater than 0.15. The second layer $L_{SSC2}$ is constituted of the resin composition 2 after curing, cured resin 2, said cured resin 2 showing a refractive index $n_{SSC2}$ being similar or higher than the refractive index $n_{SSC1}$.

In one embodiment, the index of refraction or refractive index $n_{SSC1}$ of the material forming the first layer $L_{SSC1}$ of protective layer is lower than the refractive index nm of the material forming the at least one or plurality of optical elements such as microstructures or microlenses such that the difference $n_m-n_{SSC1}$ is greater than 0.16, preferably greater than 0.2, 0.3, or even greater than 0.5. Indeed, for an optical element such as microlens of a given diameter and a given desired optical power, the addition of an abrasion-resistant coating tends to increase the maximum height of the optical elements which is required to achieve said optical power. On the other hand, the more important the difference in refractive index between the material forming the abrasion-resistant coating and the material forming the optical element, the lower is said needed maximum height, and in turn the easier is the base-lens substrate and its microlenses to manufacture.

The protective layer in the present invention has the role of presenting a contrast in refractive index with the optical elements in order to ensure the optical function of the optical elements thanks to its layer $L_{SSC1}$. Its role is also to protect the base lens substrate from scratches and abrasion thanks to its layer $L_{SSC2}$.

The resin composition having more affinity with the substrate, i.e resin composition 1, should also show a good chemical affinity with the lens base substrate and the at least one or plurality of optical elements for a good adhesion, mechanical and cohesion properties. On the other hand, the resin composition with more affinity for the surface/air, i.e resin composition 2, must exhibit sufficient chemical affinity with the resin composition 1, so as to produce a good adhesion between these two layers after curing, and must result in smooth surface at the cured resin 2/air interface.

The cured resin 1 exhibiting a low refractive index can result from the curing of a resin composition 1 comprising an organic polymer, monomer or mixture of both and optionally a crosslinking agent C1 and/or inorganic nanoparticles NP1 and the cured resin 2 showing a good abrasion resistance can result from the curing of a resin composition 2 comprising an organic polymer, monomer or mixture of both and optionally a crosslinking agent C2 and/or inorganic nanoparticles NP2, provided that:

the resin compositions 1 and 2 are not fully miscible with each other, have a different surface tension, the difference in the surface tensions of the at least two resin compositions is greater than 4 mN/m, preferably greater than 10 mN/m and the surface tension of the resin composition 1 being greater than the surface tension of the lens substrate and also greater that the surface tension of the at least one or plurality of optical elements;

the resin composition 2 exhibits sufficient chemical affinity with the resin composition 1, so as to produce a good adhesion between these two layers and results after curing into a smooth surface.

The resin compositions 1 and 2 can be any layer conventionally used as abrasion-resistant coating in the field of ophthalmic lenses provided that:

the resin composition 1 and 2 are not fully miscible with each other, have a different surface tension, the difference in the surface tensions of the at least two resin compositions is greater than 4 mN/m, preferably greater than 10 mN/m and the surface tension of the resin composition 1 being greater than the surface tension of the lens substrate and also greater that the surface tension of the at least one or plurality of optical elements;

the resin composition 2 exhibits a good affinity exhibit sufficient chemical affinity with the resin composition 1, so as to produce a good adhesion between these two layers after curing, and must result in smooth surface at the cured resin 2/air interface.

and preferably provided that the self-stratifying composition comprising both resin composition 1 and 2 can be applied by wet deposition on the optical elements to be coated.

The cured resins 1 and 2 can for instance be both made of two different nanocomposite materials, i.e made of a cured matrix, optionally cross-linked and nanoparticles. One of these resins 1 or 2 or both can be cross-linked. Resin 2 which has as main attribute a good mechanical strength, good abrasion and scratch resistance is preferably cross-linked.

The cured matrix of the cured resin 1 or 2 or the cross-linked matrix of cured resin 1 or 2 is for instance independently made from acrylic compounds, epoxy compounds, epoxy acrylic compounds, silane compounds, epoxysilane compounds, polyurethane acrylic compounds, siloxane compounds and any mixture of the aforesaid compounds.

The nanoparticles are chosen so as to reduce the refractive index of the resin or so as to increase the hardness of the resin. In both cases, the nanoparticles useful for the present invention show a diameter less than 70 nm, preferably less than 50 nm, and even preferably less than 30 nm, and must present a surface chemically compatible with the compounds used for forming the matrix.

The nanoparticles useful for the resin composition 1 can typically be chosen from silica nanoparticles (SiO2) having a refractive index ranging from 1.04 to 1.5, for example hollow silica nanoparticles having a refractive index ranging from 1.05 to 1.4, functionalized or surface-modified silica nanoparticles, functionalized or surface modified hollow nanoparticles and a mixture thereof. An example of compatible hollow silica nanoparticles could be Thrulya, colloidal hollow silica nanoparticles produced by JGC C&C.

Silica particles of refractive index ranging from 1.4 to 1.5 (such as Nanocryl C-150 (50% nanosilica dispersed in trimethylol propane triacrylate—TMPTA or IPA-ST (10-15 nm silica particles dispersed in isopropanol at 30% wt) can be used.

Other non-limiting examples of commercially available surface treated Si02 dispersed particles in solvent or monomer include Nanocryl® C-140 (50% Si02 in 50% hexandioldiacrylate), Nanocryl® C-165 (50% Si02 in 50% alkoxylated pentaerythritol tetraacrylate) from Evonik Industries, Inc. (Germany), and IPA-AC-2101 (30 wt % Si02 dispersed in 70 wt. % isopropyl alcohol and PM-AC-2101 (30 wt % Si02, dispersed in 70 wt. % 1-methoxy-2-propanol from Nissan Chemical America (Pasadena, TX, USA).

Other non-limiting examples of commercially available surface treated Si02 dispersed particles in solvent or monomer include Nanocryl® C-140 (50% Si02 in 50% hexandioldiacrylate), Nanocryl® C-165 (50% Si02 in 50% alkoxylated pentaerythritol tetraacrylate) from Evonik Industries, Inc. (Germany), and IPA-AC-2101 (30 wt % Si02 dispersed in 70 wt. % isopropyl alcohol and PM-AC-2101 (30 wt % Si02, dispersed in 70 wt. % 1-methoxy-2-propanol from Nissan Chemical America (Pasadena, TX, USA).

In embodiments, it could be necessary to functionalize the inorganic nanoparticles, to compatibilize them with an agent to ensure the affinity and or chemical compatibility of the particles with the organic polymer, monomer and optional crosslinking agent comprised in the resin composition. Thus in embodiments, the inorganic nanoparticles NP1 in resin composition 1 can be functionalized with an agent A1 to ensure the affinity and or chemical compatibility of the particles NP1 with the organic polymer, monomer and or optional crosslinking agent C1, comprised in resin composition 1. The inorganic nanoparticles NP2 can be functionalized with an agent A2 to ensure the affinity and or chemical compatibility of the particles NP2 with the organic polymer, monomer and optional crosslinking agent, comprised in resin composition 2. For example, the hollow silica particles can be functionalized with γ-glycidoxypropyltrimethoxysilane (Glymo®). Silica nanoparticles dispersed in solvent, in colloidal form can also be functionalized for example with phenyltriethoxysilane (PhTES).

In one embodiment, the cured resin 1 results from the curing of an organic polymer, monomer or mixture of both, in presence of a crosslinking agent C1, and in the presence of nanoparticles, preferably of silica nanoparticles and more preferably silica nanoparticles having a refractive index ranging from 1.04 to 1.5, for example hollow silica nanoparticles having a refractive index ranging from 1.04 to 1.4, functionalized silica nanoparticles, functionalized hollow nanoparticles and a mixture thereof and the cured resin 2 results from the curing of an organic polymer, monomer or mixture of both in presence of a crosslinking agent C1 and preferably in the presence of nanoparticles and more preferably in the presence of functionalized silica nanoparticles and optionally in the presence of a crosslinking agent C1.

The self-stratifying coating composition can advantageously comprise an epoxy compound, a crosslinker, silica nanoparticles, a siloxane compound more particularly a silsesquioxane and a solvent or mixture of solvents.

According to this embodiment, the epoxy compound is advantageously selected from the group of epoxy compounds having at least one cycloaliphatic or aryl group and a C/O ratio higher than or equal to 3, for example from the group of glycidyl ethers of the condensation products of dicyclopentadiene and phenol such as Tactix® 556 from Ciba, epoxy phenol novolacs such as Epon® 155, 160, 861, 862 from Shell Chemical or Epalloy®8230, 8240, 8250, 8330, 8350 from CVC Specialty Chemicals, epoxy cresol novolacs such as Epon® 164, RSS-2350 from Shell Chemical or Araldite® ECN 1235, 1871, 9699 from Ciba, epoxy bisphenol A novolacs such as SU® resin from Shell Chemical, bisphenol A diglycidyl ether, bisphenol A diglycidyl ether resins such as Epon® 828 from Shell Chemical and 4-glycidyloxy-N,N-diglycidyl aniline, more preferably Bisphenol A diglycidyl ether.

Still according to this embodiment, the crosslinking agent can be selected from the group of polyamines, polythiols, polyols, polycarboxylic acids, preferably polyamines, such as diethylenetriamine. The nanoparticles are preferably functionalized silica nanoparticles or silica nanoparticles dispersed in a solvent or a mixture thereof, for example hollow silica nanoparticles having a refractive index ranging from 1.04 to 1.4, hollow silica nanoparticles functionalized with a silicone coupling agent such as γ-glycidoxypropyltrimethoxysilane, or silica nanoparticles functionalized with a silicone coupling agent such as γ-phenyltriethoxysilane or a mixture thereof. The siloxane compound is selected from organo-siloxane resins or polysiloxanes, such as arylsiloxane or alkyl siloxane or mixture thereof, preferably a silsesquioxane, more preferably a phenyl silsesquioxane. The solvents generally used for the preparation of self-stratifying composition are a solvent with a high volatility and polarity used for the high surface energy resin (top layer or resin composition 2 in the present invention), and preferably a solvent with a low volatility and polarity for the low surface energy resins (bottom layer or resin composition 1 in the present invention). The solvent or mixture of solvent is advantageously a mixture of Butyl Acetate and Xylene. In this particular case the optical article comprises a protective layer composed of

- a first layer $L_{SSC1}$ constituted of a cured resin 1 showing a refractive index of for example between 1.43 and 1.49 (depending of the proportion of nanoparticles in the resin composition) and
- a second layer $L_{SSC2}$ constituted of a cured resin 2 showing refractive index of for example between 1.51 and 1.53 (depending of the proportion of nanoparticles in the resin composition). This embodiment is particularly advantageous when both the lens base substrate and the at least one or plurality of optical elements (such as microlenses) are made of polycarbonate, such as polycarbonate (PC) Lexan OQ3820®, sold by Sabic and has a refractive index of 1.586.

In another embodiment, the self-stratified coating can comprise as first layer $L_{SCC1}$ a cross-linked resin without any nanoparticles. According to this embodiment, the self-stratifying coating composition useful for forming the self-stratified coating can comprise a polyol, a polyurethane dendrimer and a crosslinking agent and a solvent or mixture of solvents.

Still according to this embodiment, the polyol is for example selected from the group consisting of a fluorinated polyether, a fluoroethylene-alkyl vinyl ether and a combination thereof, preferably a fluoroethylene-alkyl vinyl ether;

the polyurethane dendrimer can be selected from the group consisting of isophorone diisocyanate (IPDI), isophorone triisocyanate (IPTI) and a combination thereof, preferably isophorone diisocyanate (IPDI); and the crosslinking agent can be an isocyanate-functional compound selected from the group consisting of hexamethylene diisocyanate (HDI), hexamethylene triisocyanate (HTI), methylene bis-(4-cyclohexyl isocyanate) (HMDI), HDI biuret, HDI isocyanurate and a combination thereof, preferably hexamethylene diisocyanate (HDI) or HDI biuret.

In embodiments, the protective layer is composed a self-stratified coating having two distinct layers $L_{SSC1}$ and $L_{SSC2}$ (See for instance as shown in FIGS. 2a and 2b; protective layer 20, $L_{SSC1}$ 20a and $L_{SSC2}$ 20b)

Figure 2C:
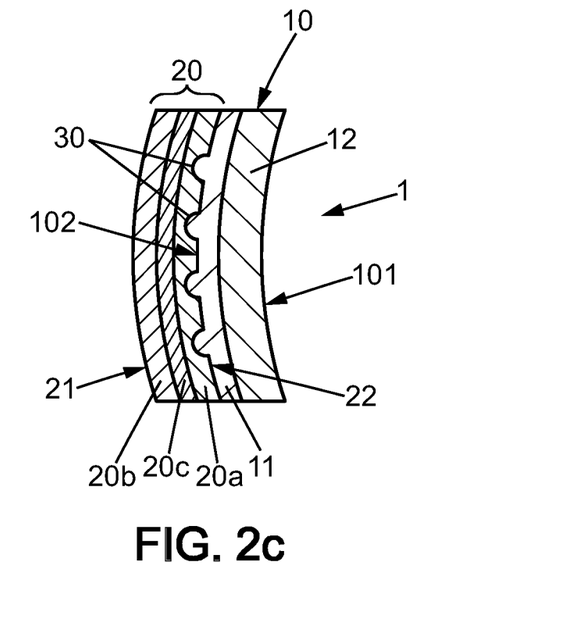
Figure 2D:
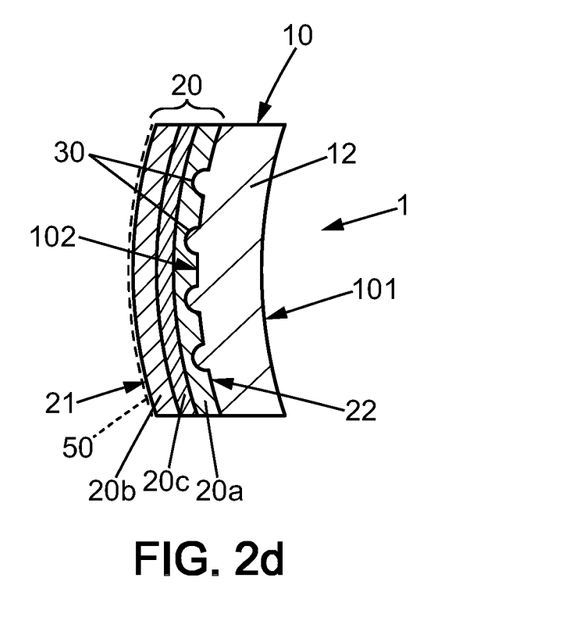

In other embodiments, the protective layer is composed a self-stratified coating having in addition to the at least two distinct layers $L_{SSC1}$ and $L_{SSC2}$, a middle diffuse interface layer including a mixture of components of the resin composition 1 of the first layer $L_{SSC1}$ and a mixture of components of the resin composition 2 of the second layer $L_{SSC2}$, the middle diffuse interface phase separating said first layer and said second and exhibiting the attributes of either the resin 1 or the resin 2 according to which makes up the most of its composition. (See for instance as shown in FIGS. 2c and 2d; protective layer 20, $L_{SCC1}$ 20a, $L_{SSC2}$ 20b and middle diffuse interface phase 20c)

The protective layer fully encapsulates the optical elements.

The protective layer has a maximum thickness, measured in a direction perpendicular to the first protective surface between the first and second protective surfaces, of between at least 2 times and at most 10 times, preferably of between at least 2.5 times and at most 5 times of the maximum height of each of the optical elements.

The maximum thickness of the protective layer in the present invention is measured in a direction perpendicular to the first protective surface between the first and second protective surfaces. Such thickness corresponds to the highest thickness in any point at the surface. It does not correspond to the thickness above the optical elements, but to the total thickness (including the height of the optical elements) since the protective layer is also present between the optical elements.

Typically the maximum thickness of the protective layer can be less than or equal to or between any two of 200 micrometers (µm), 150 µm, 100 µm, 90 µm, 80 µm, 70 µm, 60 µm, 50 µm, 40 µm, 30 µm, 20 µm, 10 µm while being preferably at least 2 times, more preferably at least 5 times, for example between 2.5 to 10 times or between 2.5 to 8 times greater than the maximum height of the optical element or the plurality of optical elements.

Furthermore, the minimum thickness of the protective layer is measured at the optical elements, and more specifically at the point of maximal height of the optical elements. At this point the minimum thickness of the protective layer, measured at the point of maximal height of the optical elements and from that point, may be inferior or equal to the height of the optical elements at that point, and inferior or equal to a height of 10 µm, whichever is the highest, preferably inferior or equal two-third or even half the optical element height, preferably inferior or equal to 2 µm, for instance comprised between 1 and 5 µm.

The layer $L_{SCC1}$ has a maximum thickness, measured in a direction perpendicular to the first protective surface between the first and second protective surfaces, of between at least 1 time and at most 5 times, preferably of between at least 1.1 times and at most 3 times of the maximum height of each of the optical elements.

The maximum thickness of the layer $L_{SCC1}$ in the present invention is measured in a direction perpendicular to the first protective surface between the first and second protective surfaces. Such thickness corresponds to the highest thickness in any point at the surface. It does not correspond to the thickness above the optical elements.

Typically the maximum thickness of the layer $L_{SCC1}$ can be less than or equal to 100 µm while being preferably at least 1.2 times, more preferably at least 1.4 times, for example between 1.4 to 3 times greater than the maximum height of the optical element or the plurality of optical elements, whichever is the lowest.

The layer $L_{SCC2}$ has a maximum thickness, measured in a direction perpendicular to the first protective surface between the first and second protective surfaces, of between at least 1 time and at most 5 times, preferably of between at least 1.1 times and at most 3 times of the maximum height of each of the optical elements.

The maximum thickness of the layer $L_{SCC2}$ in the present invention is measured in a direction perpendicular to the first protective surface between the first and second protective surfaces. Such thickness corresponds to the highest thickness in any point at the surface. It does not correspond to the thickness above the optical elements, but to the total thickness (including the height of the optical elements) since the protective layer is also present between the optical elements.

Typically the maximum thickness of the layer $L_{SCC2}$ can be less than or equal to 100 µm while being preferably at least 1.2 times, more preferably at least 1.4 times, for example between 1.4 to 3 times greater than the maximum height of the optical element or the plurality of optical elements, whichever is the lowest.

In a particular embodiment, the protective layer 20 composed of the at least two layers $L_{SSC1}$ (20a) and $L_{SSC2}$ (20b) covers the surface of the base lens substrate 10 from which each optical element (typically a microlens) 30 protrudes, such that each optical element is fully encapsulated by the protective layer 20. The protective layer 20 therefore has a first protective surface 22 corresponding to the inner surface of the layer $L_{SSC1}$ in contact with the base lens substrate 10 and each optical element protruding thereof, and a second protective surface 21 corresponding to the outer surface or the surface of the layer $L_{SSC2}$ in contact with the air, opposite the first.

In embodiments, and as shown in FIGS. 2a and 2b, the protective layer 30 covers the front surface or second lens surface 102 of the base lens-substrate. In that case, the interface between the protective layer 20 and the base lens substrate 10 is thus formed by a back surface or first protective surface 22 of the protective layer 20 and the front surface or second lens surface 102 of the base lens substrate.

In one embodiment, the surface of the protective layer at the interface with the base lens substrate is concave. On the other hand, the second protective surface of the protective layer 21, which is the free surface of the protective layer 20 and also corresponds to the outer surface or the surface of the layer $L_{SSC2}$ in contact with the air, is convex and smooth, and exhibits the same base curve as the base curve of the surface of the base lens substrate 10, the second lens surface devoid of optical elements, in particularly thanks to the manufacturing method of the protective layer, as will be disclosed in more details below.

The difference in refraction index between the protective layer 20 and the optical elements 30 may induce reflections at the interface between the protective layer and the surface bearing the optical elements. The optical article 1 then preferably comprises a quarter-wave layer 40 at the interface between the base lens substrate 10 and the optical elements 30, suitable for reducing the amount of reflections. A quarter wave layer (also noted as λ/4 layer) having a refraction index $RI=(n_c \cdot n_m)^{1/2}$ may for instance be used.

A detailed example of λ/4 layer is disclosed in patent U.S. Pat. No. 7,008,690 of the applicant.

Last, in particular in reference with FIG. 2*b*, the optical article 1 can comprise one or more coating(s) on each of the front surface and back surface thereof. For instance, the front surface or second surface of the protective layer can be covered with at least one additional coating 50, including one or more of the following: an antireflective coating, a photochromic coating, an anti-smudge coating, an anti-fog coating, a tintable coating, a self-healing coating, an anti-rain coating, an anti-static coating, an anti-UV coating, or an anti-blue light coating.

Manufacturing Method of an Optical Article

With reference to FIGS. 3 to 6, a method for forming the optical article described above will now be disclosed.

The present invention also relates to the method of manufacturing an optical article, notably the optical article disclosed here above.

Said method of manufacturing an optical article comprises:
1) providing a base lens substrate having opposing first and second lens surfaces and
   comprising, on the second lens surface, at least one or a plurality of optical elements having a maximum height, measured in a direction perpendicular to the second lens surface, that is less than or equal to 0.1 millimeters (mm) and a diameter that is less than or equal to 2.0 mm;
2) applying by wet deposition on the second lens surface of the base lens substrate comprising the at least one or the plurality of optical elements, a curable self-stratifying composition suitable for forming a protective layer having opposing first and second protective surfaces;
3) curing the curable self-stratifying composition for forming the protective layer;
4) optionally repeating step 2 or step 2 and step 3;

the protective layer resulting from step 3 or 4 presenting a second protective surface parallel to the second lens surface of the lens devoid of optical elements,
said protective layer encapsulating the at least one or each optical element.

The protective layer of the present invention is composed of a self-stratified coating. In other words, the protective layer is obtained by curing a self-stratifying composition enabling to get in only one deposition step at least two distinct layers $L_{SSC1}$ and $L_{SSC2}$.

The Curable Composition Suitable for Forming the Protective Layer Useful for the Present Method The curable composition suitable for forming the protective layer useful for the present method is the any one of the ones described above with respect to the optical article. More generally, all the characteristics described above in connection with the optical article also apply to the method of manufacturing the article or the said optical article, the said method being another object of the present invention. Conversely, all the characteristics described below in connection with the method also apply to the optical article.

The Deposition of the Curable Coating using Wet Deposition Techniques

In the method of the present invention, the curable composition suitable for forming a protective layer is applied on the at least one or a plurality of optical elements to be coated by wet deposition techniques.

In particular the curable composition is applied by a step of spin coating, a step of spray coating, a step of rod coating, or a step of inkjet coating, in such a way that the final cured coating, the protective layer presents a smooth surface parallel to the surface of the base lens substrate without the optical elements or microstructures. The second protective layer of the protective layer does not replicate the height change present at the first protective surface.

With a step of spin coating, a large amount of coating is deposited on the whole surface of the lens, the lens is spun to set the thickness at the target value.

Figure 3:
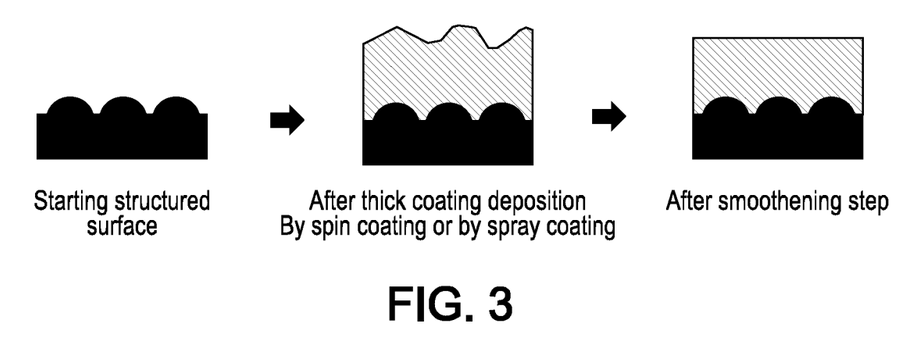
FIG. 3 schematically shows the spin coating or spray coating step of the method for manufacturing an optical article according to an embodiment.
Figure 4:
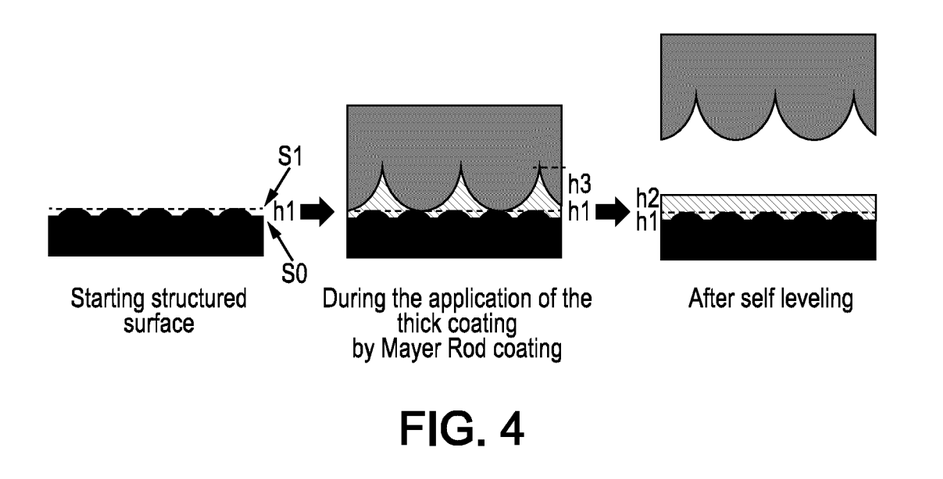
FIG. 4 schematically shows the rod mayer coating step of the method for manufacturing an optical article according to an embodiment.

With a step of spin coating or spray coating, the coating might exhibit a non-smooth surface due either to the tendency to replicate the substrate structured surface (spin coating, curtain coating, . . . ) or due to the deposition technique itself (spray coating) (FIG. 3). In such embodiment, in order to make sure to obtain a protective layer with a smooth surface (a smooth second protective surface) a subsequent heating step at low temperature of the applied curable coating can be carried out after the deposition of a thick layer of composition (i.e between steps 3 and 4 of the method object of the present invention). Such low temperature heating step at a temperature lower the boiling temperature of the main solvent/monomer enables to decrease the viscosity of the curable composition.

Alternatively in order to make sure to obtain a protective layer with a smooth surface, a leveling agent can be added to the curable coating composition to even out the surface tension of the wet coating composition.

Figure 5:
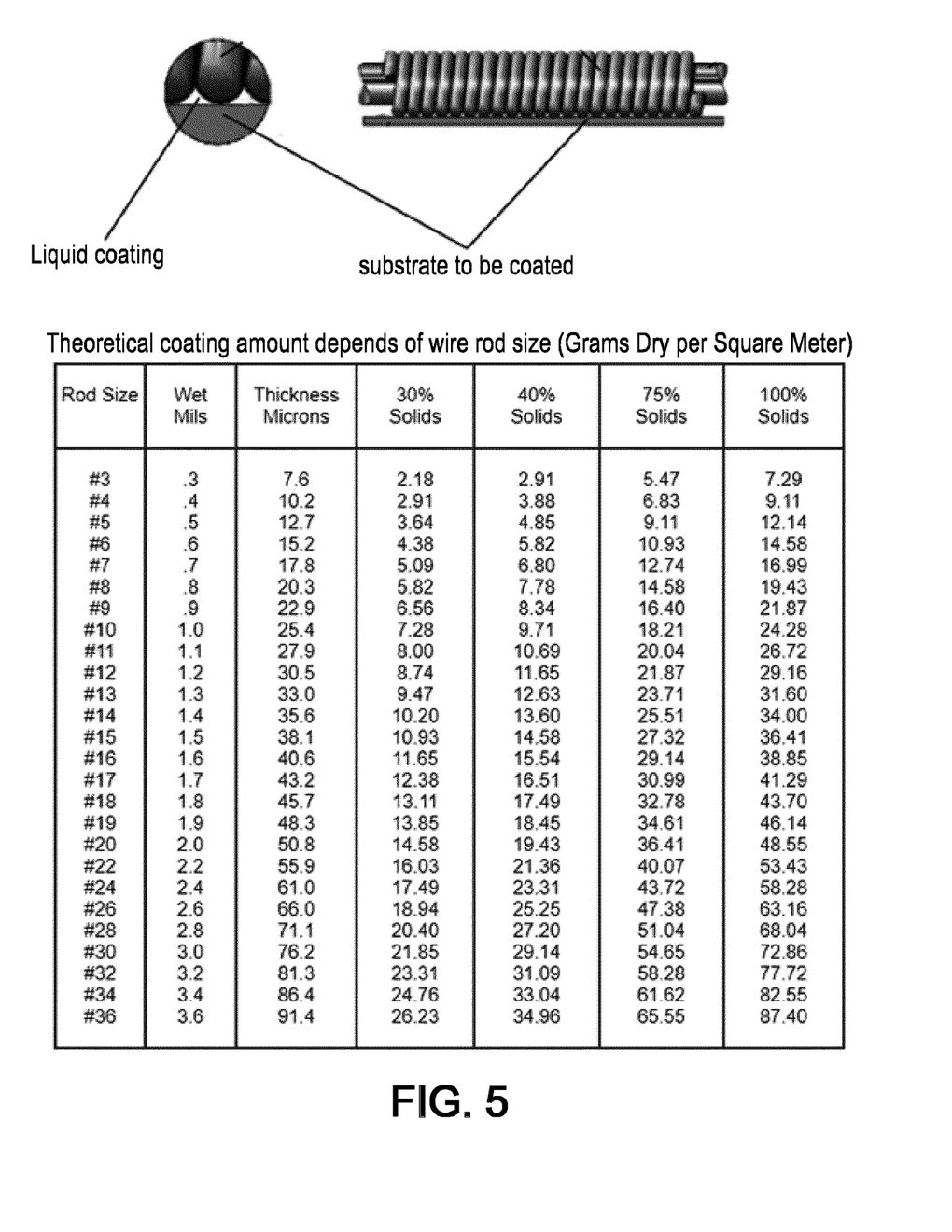
FIG. 5 also relates to the rod mayer coating step of the method for manufacturing an optical article according to an embodiment.

The curable coating can be applied using a Mayer rod (or wire-wound rod) coating approach. Large amount of coating is deposited on the lens, the Mayer rod (built with a flexible core) is rolled across the surface of the lens. The Rod number is between #6 and #15, depending on the solid content, in order to obtain a hard coat thickness higher than 5 microns and preferentially higher than 10 microns. (FIG. 5)

The advantage of the Mayer rod (or wire-wound rod) coating approach is that it fills the space between the optical elements or microstructures and applies a coating thickness on top of the surface S1. The surface S1 is parallel to the uniform surface of the lens S0 (i.e the second lens surface) (without optical elements), defined by the highest points of the optical elements, at a distance h1 from S0. The distance h1 represents the height of the optical elements. The distance h3 is the highest distance filled by the liquid curable coating between the wound wires on the Mayer rod. The distance h3 is defined by the geometry of the Mayer rod, and in the case of a wire wound rod, is defined by the diameter of the wire wound around the rod. The thickness h2 is defined by h3 after leveling. The final thickness of the coating will depend on h2 and the solid content (as illustrated in the FIG. 4). In this embodiment the rod used to apply the coating has its axis parallel or almost parallel to the surface S1. For a very flat base (for instance Semi finished lenses used for high myopic prescriptions) a rigid typical metal rod can be used. However, preferentially, the rod has enough flexibility to follow the curvature defined by S1.

Figure 6:
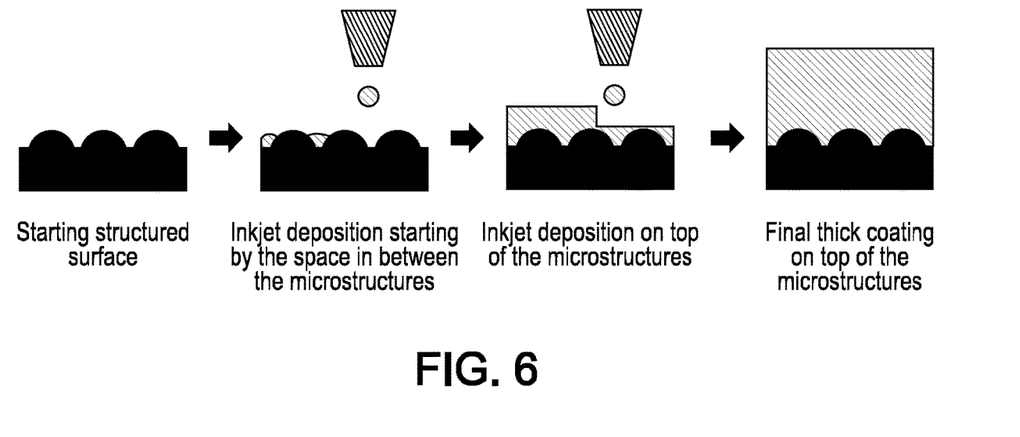
FIG. 6 schematically shows the inkjet coating step of the method for manufacturing an optical article according to an embodiment

The curable composition can also be applied using inkjet coating technique. In such embodiment, the deposition of the curable coating is carried out in a pattern which is the complementary pattern of the height microstructure. Typically the step of wet deposition comprises as illustrated in FIG. 6:

- A first step or first pass depositing a limited or measured quantity of the curable coating composition at the bottom only of the optical elements (only partially covering the microstructures) resulting in a first layer
- A second step or second pass depositing another limited quantity of the curable coating composition on top of the 1st layer in order to cover more, fully cover, the optical elements, then
- Optionally an additional pass or several additional passes until the relevant thickness is reached, typically until the maximum thickness or height of the curable coating composition, measured in a direction perpendicular to the second base lens substrate is greater than 2 times, preferably greater than 5 times of the maximum height of the optical elements.

Still in this embodiment the step of wet deposition comprises varying the amount of the curable composition suitable for forming a protective layer depending on the local presence or absence of the at least one optical element. Such control is possible via a method implemented by a computer such as the one disclosed in EP 19306294.0

Optical Elements:

All the characteristics described below in connection with the optical articles also apply to the method, in particular with respect to the manufacturing of the lens substrate bearing microstructures.

According to a first embodiment the base lens substrate and the at least one or the plurality of optical elements are formed in a single step, preferably by injection molding or casting. In a second embodiment, the plurality of optical elements can be made by a surfacing step of the second lens surface or by a deposition material step on the second lens surface, preferably by molding or ink jet. The first embodiment is preferred.

In embodiments, the method for manufacturing the optical article may further comprise additional steps such as depositing at least one additional coating on the abrasion-resistant coating, and possibly and the main surface of the base-lens substrate 10 that is devoid of optical elements (microlenses), said additional coating comprising an antireflective coating, a photochromic coating, an anti-smudge coating, an anti-fog coating, a tintable coating, a self-healing coating, an anti-rain coating, an anti-static coating, an anti-UV coating, or an anti-blue light coating. The main surface of the base-lens substrate devoid of micro-lens may also be coated with an abrasion-resistant coating.

If the base-lens substrate 10 is or comprise a semi-finished lens, the method may further comprise finishing steps including surfacing the semi-finished lens to obtained the desired target power, and/or trimming the obtained lens.

EXAMPLES

The lens with microlenses used in all the following examples is made of polycarbonate (PC) Lexan OQ3820®, sold by Sabic and has a refractive index of 1.586.

Example 1

Preparation of the Curable Self-Stratifying Resin (Protective Layer):
Ingredients:
  Monomer Resin 1: Bisphenol-A diglycidyl ether (Epoxy Equivalent weight 172-176) sold by Sigma Aldrich (with a refractive index of 1.57)
  Cross linking agent C1: Diethylenetriamine sold by Sigma Aldrich
  Nanoparticles 1 (NP1) chosen so as to reduce the refractive index of the resin 1: a hollow silica particle-methyl isobutyl ketone dispersion sol (Thrulya® 4320, JGC C&C Co., Ltd., 20% w/w)
  Agent A1 to ensure the affinity and or chemical compatibility of the particles NP1 with the Resin 1: γ-glycidoxypropyltrimethoxysilane (Glymo®) sold by Gelest
  Resin 2: phenylsilsesquioxane resin sold by Dow Corning (with a refractive index of 1.56)
  Nanoparticles 2: silica nanoparticles in solvent, IPA-ST (10-15 nm silica particles dispersed in isopropanol at 30% wt) sold by Nissan Chemicals with a refractive index of 1.45.
  Agent A2 to ensure the affinity and or chemical compatibility of the particles NP1 with the Resin 2: Phenyltriethoxysilane (PhTES)
Other Solvents:
  Butyl Acetate and Xylene
Process:
  NP1 were functionalized with A1 (Glymo) following the procedure described by Eslami-Farsani et al. in "International Journal of Chemical and Molecular Engineering Vol: 9, No:12, 2015 (refractive index of these functionalized NP1/A1=1.30)
  NP1/A1 was transferred to BuAc, then Xylene added for BuAc:Xylene (1:1)
  Resin 1 was dissolved in BuAc:Xylene (1:1)
  Resin 1 and NP1/A1 were mixed in order to get a 30% wt solution=Solution1
  NP2 was functionalized with A2 (PhTES) following the procedure described by Eslami-Farsani et al. in "International Journal of Chemical and Molecular Engineering Vol: 9, No:12, 2015 (refractive index of these functionalized NP2/A2=1.45)
  NP2/A2 was transferred to BuAc, then Xylene added for BuAc:Xylene (1:1)
  Resin 2 was dissolved in BuAc:Xylene (1:1)
  Resin 2 and NP2/A2 were mixed in order to get a 30% wt solution (Resin 2 solution)
  C1 was dissolved at 50% prior to its addition to Resin 2 solution, in a stoichiometric ratio vs epoxy of Resin 1 (Solution 2)
  Solution 2 was added to solution 1 slowly
  Mixing for ~5 min before application
  After deposition the curable self-stratifying composition by spray coating on the lens comprising microlenses (wet coating thickness: ~200 microns), the curable coating composition was heated at room temperature for 24 hours then at 110° C. during 2 H.
  Final coating thickness: ~50-70 microns
  Self-stratification of type 1: 2 distinct and homogeneous layers
    Layers refractive index: (PC=1.596)
    Layer 1 $L_{SSC1}$: 1.43 (~50% BPA epoxide@1.57+~50% hollow silica@1.30)
    Layer 2 $L_{SSC2}$: 1.51 (~50% Silicone resin@1.56+~50% silica@1.45)

Example 2

Self-Stratification of Type 1: 2 Distinct and Homogeneous Layers
  Same as Ex.1 but only 30% of NPs:
  Layer 1 $L_{SSC1}$: 1.49 (~70% BPA epoxide@1.57+~30% hollow silica@1.30)
  Layer 2 $L_{SSC2}$: 1.53 (~70% Silicone resin@1.56+~30% silica@1.45)

Example 3

Preparation of the Curable Self-Stratifying Resin (Protective Layer):
Ingredients:
  Polymer 1: Lumiflon® LF200, crosslinkable fluorinated polymer, a fluoroethylene vinyl ether resin 50% wt in Xylene sold by AGC Chemicals Americas. (refractive index=1.43)
  Cross linking agent C1: Desmodur® N75 MPA/X sold by Covestro, Hardner Isocyanates Aliphatic or aliphatic polyisocyanate 75% wt./wt, in a mixture 1:1 vol./vol, of 1-methoxy-2-propylacetate/xylene, NCO content 16.5%.
  Resin 2: Desmolac® 4125 sold by Covestro, a non-functional linear polyurethane 25% wt./wt, in a mixture 50:37:13 vol./vol, of isopropanol/toluene/2-methoxy-1-propylacetate. (refractive index=1.49)
Process:
  3.15 g of Desmodur® N75 MPA/X (C1) is added to 49.5 g of Desmolac® 4125 solution (Resin 2), the mixing is ensured by a high speed Mixer DAC 150 from Flacktek, at 2700 rpm for 45 s.
  20 g of Lumiflon LF200 solution (Resin 1) is then added to the solution made of Desmolac® 4125 and Desmodur® N75, and mixed with a high speed mixer DAC 150 from Flacktek, at 2700 rpm for 45 s.
  After deposition the curable self-stratifying composition by rod coating on the lens comprising microlenses (wet coating thickness: 150 microns), the curable coating composition is heated at room temperature for 24 hours then at 80° C. during 2 H.
Final Coating thickness: 50 microns
  Self-stratification of type 2: the air/resin interface (layer LSSC2) is rich in Desmolac 4125. The lens/resin interface (layer LSSC1) is rich in LF200 (fluorinated resin of low refractive index).

The invention claimed is:

1. An optical article comprising:
   a base lens substrate having opposing first and second lens surfaces;
   a protective layer having opposing first and second protective surfaces, the first protective surface disposed on the second lens surface; and
   at least one or a plurality of optical elements, each:
     defining a portion of one of the first protective surface and the second lens surface;
     having a maximum height, measured in a direction perpendicular to the second lens surface carrying them, that is less than or equal to 0.1 millimeters (mm) and a diameter that is less than or equal to 2.0 mm;
   wherein
   the protective layer is composed of:
     a self-stratified coating having at least two distinct layers:
       a first layer $L_{SSC1}$ corresponding to the innermost part of the protective layer and having two opposing surfaces, one surface corresponding to first protective surface
       and a second layer $L_{SSC2}$ corresponding to the outermost part of the protective layer and having two opposing surfaces, one surface corresponding to second protective surface
     the self-stratified coating resulting from the polymerization of a self-stratifying composition comprising at least two, preferably two incompatible resin compositions, resin composition 1 and resin composition 2;
     the first layer $L_{SSC1}$ being constituted of one of the at least two resin composition, resin composition 1 after curing, cured resin 1, said cured resin 1:
       showing a refractive index $n_{SSC1}$ being lower than the refractive index $n_m$ of the at least one or each optical element such that the difference $n_m-n_{SSC1}$ is greater than 0.045, preferably greater than 0.10, or even greater than 0.15;
     the second layer $L_{SSC2}$ being constituted of the other one of the at least two resin compositions, resin composition 2 after curing, said cured resin 2:
       showing a refractive index $n_{SSC2}$ being similar or higher than the index $n_{SSC1}$.

2. The optical article of claim 1 wherein:
the at least one or each optical element is chosen among the group consisting of microlens, Fresnel structure, diffractive structure such as microlenses defining each a Fresnel structure, permanent technical bump and phase-shifting element, preferably is a microlense.

3. The optical article of claim 1, wherein
the protective layer has a maximum thickness, measured in a direction perpendicular to the first protective surface between the first and second protective surfaces, of between at least 2 times and at most 10 times, preferably of between at least 2.5 times and at most 5 times of the maximum height of each of the optical elements.

4. The optical article of claim 1, wherein
the layer $L_{SCC1}$ has a maximum thickness, measured in a direction perpendicular to the first protective surface between the first and second protective surfaces, of between at least 1 time and at most 5 times, preferably of between at least 1.1 times and at most 3 times of the maximum height of each of the optical elements.

5. The optical article of claim 1, wherein
the layer $L_{SCC2}$ has a maximum thickness, measured in a direction perpendicular to the first protective surface between the first and second protective surfaces, of between at least 1 time and at most 5 times, preferably of between at least 1.1 times and at most 3 times of the maximum height of each of the optical elements.

6. The optical article of claim 1, wherein:
the at least one or each optical element has a maximum height, measured in a direction perpendicular to the second lens surface, that comprised between 2 and 20 micrometers (μm) and a diameter that is comprised between 0.8 and 2.0 millimeters (mm).

7. The optical article of claim 1, wherein:
each of the at least two resin compositions has a different surface tension, the difference in the surface tensions of the at least two resin compositions is greater than 4 mN/m, preferably greater than 10 mN/m and the surface tension of the resin composition 1 being greater than the surface tension of the lens substrate.

8. The optical article of claim 1, wherein
the cured resin 1 results from the curing of an organic polymer, monomer or mixture of both, in presence of a crosslinking agent C1, and in the presence of nanoparticles, preferably of silica nanoparticles and more preferably silica nanoparticles having a refractive index ranging from 1.04 to 1.5, for example hollow silica nanoparticles having a refractive index ranging from 1.04 to 1.4, functionalized silica nanoparticles, functionalized hollow nanoparticles and a mixture thereof; and
the cured resin 2 results from the curing of an organic polymer, monomer or mixture of both in presence in the presence of nanoparticles and more preferably in the presence of functionalized silica nanoparticles, and optionally in the presence of a crosslinking agent C1.

9. The optical article of claim 1, wherein
the self-stratifying coating composition comprises:
an epoxy compound, a crosslinker, silica nanoparticles, a siloxane compound more particularly a silsesquioxane and a solvent or mixture of solvents.

10. The optical article of claim 1, wherein
the epoxy compound is selected from the group of epoxy compounds having at least one cycloaliphatic or aryl group and a C/O ratio higher than or equal to 3, for example from the group of glycidyl ethers of the condensation products of dicyclopentadiene and phenol, epoxy phenol novolacs, epoxy cresol novolacs, epoxy bisphenol A novolacs, bisphenol A diglycidyl ether, bisphenol A diglycidyl ether resins and 4-glycidyloxy-N,N-diglycidyl aniline, more preferably bisphenol A diglycidyl ether;
the crosslinking agent is selected from the group of polyamines, polythiols, polyols, polycarboxylic acids, preferably polyamines, such as diethylenetriamine;
the nanoparticles are functionalized silica nanoparticles or silica nanoparticles dispersed in a solvent or a mixture thereof, for example hollow silica nanoparticles having a refractive index ranging from 1.04 to 1.4, hollow silica nanoparticles functionalized with a silicone coupling agent such as γ-glycidoxypropyltrimethoxysilane, or silica nanoparticles functionalized with a silicone coupling agent such as γ-phenyltriethoxysilane or a mixture thereof;
the siloxane compound is selected from organo-siloxane resins or polysiloxanes, such as arylsiloxane or alkyl siloxane or mixture thereof, preferably a silsesquioxane, more preferably a phenyl silsesquioxane.

11. The optical article of claim 1, wherein:
the base lens substrate and the optical elements are both made in a thermoplastic or thermosetting plastic selected from, for instance: polycarbonate, of polyamide, of polyimide, of polysulfone, of copolymers of poly(ethylene terephthalate) and polycarbonate, of polyolefins, in particular of polynorbornene, of homopolymers and copolymers of diethylene glycol bis(allyl carbonate), of (meth)acrylic polymers and copolymers, in particular (meth)acrylic polymers and copolymers derived from bisphenol A, of thio(meth) acrylic polymers and copolymers, of polyurethane and polythiourethane homopolymers or copolymers, epoxy polymers and copolymers and episulfide polymers and copolymers, preferably made of polycarbonate, diethylene glycol bis(allylcarbonate) polymer, or of a thermosetting polythiourethane resin having a refractive index of 1.60 or a thermosetting polythiourethane resin having a refractive index of 1.67.

12. The optical article of claim 1, wherein
the base-lens substrate is a semi-finished lens.

13. The optical article of claim 1, wherein
the second surface of the protective layer is covered with at least one additional coating, including one or more of the following: an antireflective coating, a photochromic coating, an anti-smudge coating, an anti-fog coating, a tintable coating, a self-healing coating, an anti-rain coating, an anti-static coating, an anti-UV coating, or an anti-blue light coating.

14. A method of manufacturing an optical article of claim 1, the method comprising:
1) Providing a base lens substrate having opposing first and second lens surfaces and comprising, on the second lens surface, at least one or a plurality of optical elements having a maximum height, measured in a direction perpendicular to the second lens surface, that is less than or equal to 0.1 millimeters (mm) and a diameter that is less than or equal to 2.0 mm;
2) Applying by wet deposition, preferably by a step of spin coating, a step of spray coating, a step of rod coating or a step of inkjet coating, on the second lens surface of the base lens substrate comprising the at least one or the plurality of optical elements, a curable self-stratifying composition suitable for forming a protective layer having opposing first and second protective surfaces;
3) Curing the curable self-stratifying composition for forming the protective layer;
4) Optionally repeating step 2 or step 2 and step 3;
the protective layer resulting from step 3 or 4 presenting a second protective surface parallel to the second lens surface of the lens devoid of optical elements, said protective layer encapsulating the at least one or each optical element.

15. The method of claim 14, wherein
the base lens substrate and the at least one or the plurality of optical elements are formed in a single step, preferably by injection molding or casting.

* * * * *